(12) United States Patent
Shu et al.

(10) Patent No.: US 7,759,024 B2
(45) Date of Patent: Jul. 20, 2010

(54) CONTROLLING SHAPE OF A RETICLE WITH LOW FRICTION FILM COATING AT BACKSIDE

(75) Inventors: Emily Y. Shu, Santa Clara, CA (US); George Chen, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 587 days.

(21) Appl. No.: 11/712,192

(22) Filed: Feb. 28, 2007

(65) Prior Publication Data

US 2008/0204694 A1 Aug. 28, 2008

(51) Int. Cl.
*G03F 1/00* (2006.01)
(52) U.S. Cl. .......................................... 430/5
(58) Field of Classification Search ............... 430/5, 430/394; 355/75
See application file for complete search history.

(56) References Cited

U.S. PATENT DOCUMENTS

| 6,842,227 | B2 | 1/2005 | Shu ............................. 355/75 |
| 6,897,940 | B2 * | 5/2005 | Sogard ........................ 355/55 |
| 7,187,432 | B2 * | 3/2007 | Matsui ......................... 355/72 |
| 2002/0076625 | A1 * | 6/2002 | Shoki et al. .................... 430/5 |
| 2004/0200572 | A1 | 10/2004 | Tejnil et al. .............. 156/345.1 |
| 2007/0160874 | A1 * | 7/2007 | Hayashi et al. ............. 428/704 |

* cited by examiner

*Primary Examiner*—Stephen Rosasco
(74) *Attorney, Agent, or Firm*—Trop, Pruner & Hu, P.C.

(57) ABSTRACT

In an embodiment of the invention, an apparatus includes a reticle having a frontside including a pattern to be imaged onto a semiconductor wafer, a thin film located over a backside of the reticle to form a global convex shape and to reduce friction when sliding on a chuck, and the chuck having a topside to which the backside of the reticle conforms.

18 Claims, 4 Drawing Sheets

CONTROLLING SHAPE OF A RETICLE WITH LOW FRICTION FILM COATING AT BACKSIDE

BACKGROUND

A photomask or reticle may be used to transfer a pattern into a photoresist coated on a substrate. The reticle may have a profile or shape in cross-section that is affected by a method of fabrication or use. The reticle may be non-planar with a simple shape, such as a global concave or global convex shape. When a reticle frontside (which includes the pattern) has the global convex shape, the reticle backside may have a corresponding global concave shape. Alternatively, the reticle may be non-planar with a complex shape that mixes or combines multiple modes at different locations across the reticle, such as a local concave, local convex, or irregular shape.

The non-planar shape will cause gaps between portions of the reticle backside and portions of a frontside of a chuck which holds the reticle. Accordingly, a large force may be needed to sufficiently reduce the gaps to adequately conform the reticle backside to the chuck frontside. Consequently, sliding between the reticle backside and the chuck frontside may result in scratching damage and particle generation that can, in turn, lead to lithography errors. These problems are especially problematic for extreme ultraviolet (EUV) lithography, where stringent requirements for high flatness and minimal particle generation exist. Due to a requirement for projection of EUV light in a vacuum environment, an electrostatic chuck (e-chuck) may be used to hold the reticle in a scanner during exposure of the substrate such as a wafer.

DETAILED DESCRIPTION

Figure 1:
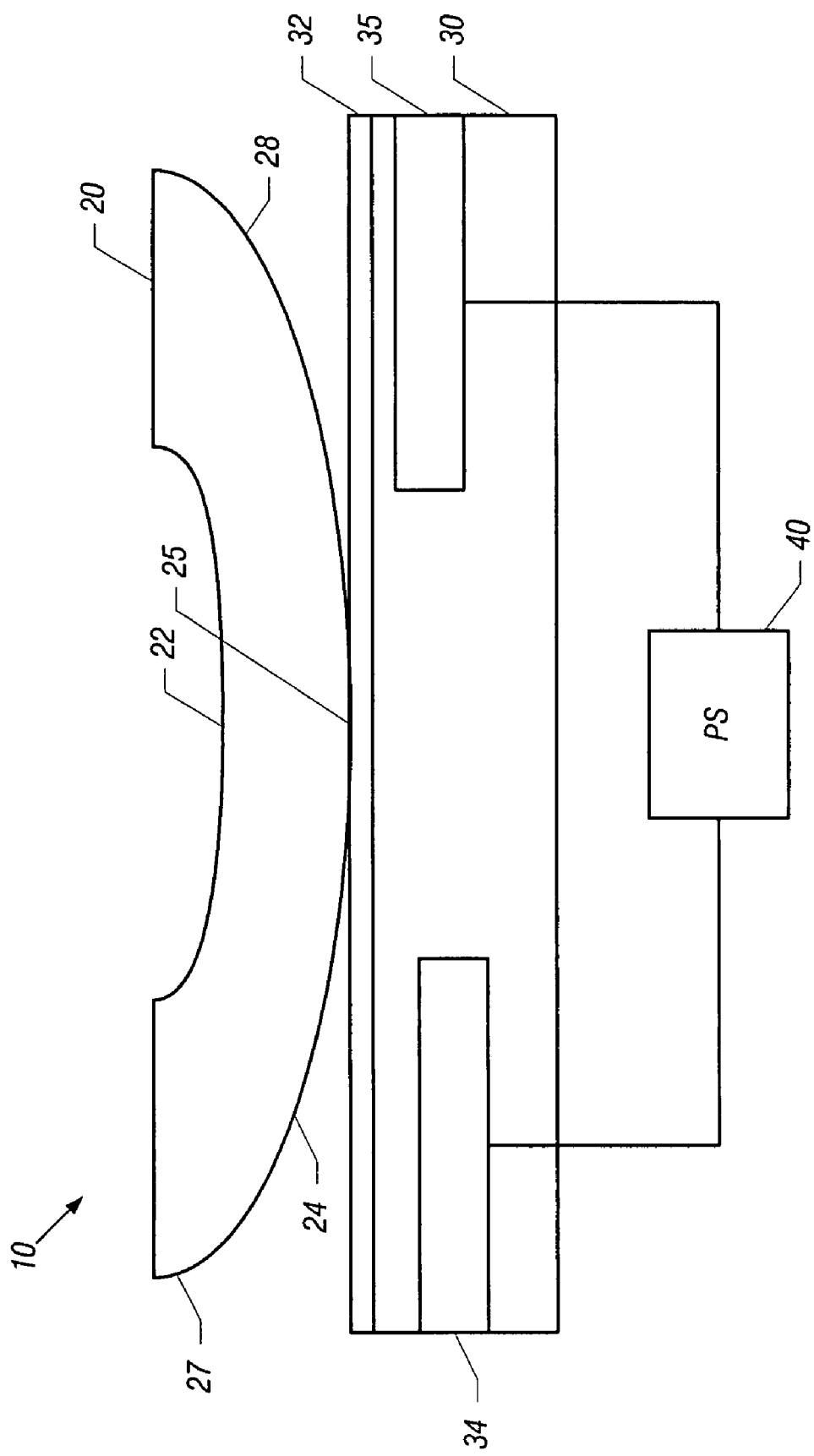
FIG. 1 is a cross-sectional view of an assembly in accordance with a general embodiment of the present invention.

In an embodiment of the present invention, a reflective reticle, such as used for extreme ultraviolet (EUV) lithography, may have a frontside that includes a pattern and a backside that includes a thin film. In another embodiment, the thin film may adhere well to the reticle backside and have low friction when sliding. In still another embodiment, the thin film may apply stress to the reticle to form a global convex shape to the reticle backside. In other embodiments, the thin film may be electrically conducting, electrically insulating, or thermally conducting.

During photolithography, the reticle may be placed on an electrostatic chuck (or e-chuck) having a topside (or frontside) in proximity to the backside of the reticle. The backside of the reticle may conform substantially in shape to the topside of the electrostatic chuck from an inner region of the reticle to an outer region of the reticle. In most cases, the e-chuck is harder and stiffer than the reticle so as to control a flatness of the reticle. In an embodiment, a lubricating fluid may be disposed over the topside of the electrostatic chuck. In another embodiment, the lubricating fluid may have a thickness that varies by position and duration of contact depending on distribution of pressure and temperature, where the lubricating fluid has non-Newtonian rheological properties. In an embodiment, the lubricating fluid will wet the reticle backside. In another embodiment, the lubricating fluid will wet the chuck frontside.

Other embodiments may include a method of forming the thin film over the backside of the reticle, deforming the reticle into a substantially convex shape with respect to the reticle backside, reducing friction of the backside of the reticle when sliding, and coupling an electrical voltage, charge, or current across or through the thin film. In different embodiments, the thin film may be electrically conducting, electrically insulating, or thermally conducting. The reticle backside may be positioned over the topside of the electrostatic chuck such that an inner region of the reticle backside contacts a corresponding inner region of the topside of the electrostatic chuck.

The electrostatic chuck may include a double-sided quadrupole configuration. The electrode of the electrostatic chuck may be designed and laid out in segments with various geometrical shapes, such as D-shapes or concentric rings. One or more voltages, such as +/−200 volts to +/−2,000 volts may be formed in the electrostatic chuck to close or reduce the gaps between the backside of the reticle and the topside of the electrostatic chuck. The location, magnitude, and polarity of the applied voltage may be changed to minimize residual polarization in the reticle.

In an embodiment, the thin film may be formed with a plurality of layers including a base layer and an overlying layer, where the base layer includes a high adhesion material and the overlying layer includes a low sliding friction material. The functional properties required, such as an electrical conductivity for the reticle backside to create a closed field loop for an e-chuck may be provided by the base layer, the overlying layer, or an intermediate layer of the thin film. In various embodiments, the layers in the thin film covering the backside of the reticle may be continuous or discontinuous. As desired, one or more of the layers in the thin film on the backside of the reticle may be patterned with lithography and etch.

In various embodiments, the shape of the reticle may be affected by the stress in the pattern on the frontside combined with the residual stress from polishing the bulk substrate (blank) for the reticle. In an advanced lithographic process, the reticle conforms to the chuck under pressure due to an applied force. Without any special treatment of the reticle, spaces or gaps may exist between the reticle backside and the chuck topside (or frontside) when the two surfaces are aligned and forced together. Positioning, closing up, or reducing the spaces or gaps will result in sliding of the reticle relative to the chuck, leading to scratches or other damage as well as particle generation at the reticle backside and/or chuck frontside.

Embodiments provide a way to avoid the damage by converting or deforming the reticle shape to a global convex shape at the backside. The conversion or deformation is achieved by modifying the thin film applied to the reticle backside to compensate for a preexisting stress. The preexisting stress may be compressive which forms a dome or global convex shape at the front side of the reticle. This leaves the reticle backside with a corresponding global concave shape such that a large space or gap will exist initially when the reticle backside and the chuck frontside are positioned in close proximity to each other. In an embodiment, appropriate material(s) and thickness(es) may be selected for the layer(s) of the thin film overlying the reticle backside so as to compensate for the preexisting stress and flatten out the reticle. In another embodiment, the reticle may be converted or deformed to become a global concave shape on the front side and a corresponding global convex shape on the backside, thus achieving a desired reticle shape to minimize the sliding to close or reduce the gaps. Therefore, a blank (substrate) for the reticle may be treated as described herein to have a global convex shape as viewed from the backside of the reticle. In this way, improved flatness during lithographic use of the reticles can be realized. As will be described further below, a coating of thin film on the reticle backside may enable the conversion or deformation.

After conversion, the reticle backside may not have a global convex shape and may still have residual low areas, such as a local convex shape which can form small gaps when in contact with the chuck surface. In addition to providing a desired shape for the reticle, the thin film formed on the reticle backside and/or on the chuck frontside may further reduce sliding friction between the reticle and the chuck. In the case of using an electrostatic chuck, the thin film on the reticle backside may provide an electrically conducting, electrically insulating, or thermally conducting path. If an underlying layer is used to provide the electrically conductivity function, then an overlying layer may be used to provide the low sliding friction function.

Using a reticle in accordance with an embodiment of the present invention will permit intimate contact of a reticle backside to an electrostatic chuck topside (or frontside) which are coupled by an applied voltage during lithographic operations. More specifically, the high points of the global convex or (multiple) local convex on the reticle backside, will initially contact the electrostatic chuck frontside. The gap between the backside of the reticle and the frontside of the chuck may be gradually closed or reduced from the regions nearer the center outwards and towards the regions nearer the periphery, such as the edges. Because the chucking force may be stronger for the smaller gaps, the smaller gaps that are near the contacting points may be closed or reduced earlier (i.e., nearer the center of the reticle if its shape is a global convex, or nearer the high points which touch the chuck if its shape is irregular). This chucking pressure, may be 10-100 kilopascals (kPA), or near one atmospheric pressure, in some embodiments. Thus, the reticle will be pulled flat from the high point(s) outward towards its periphery radially, with the chucking force always strongest next to the contacting surface of the reticle with respect to the electrostatic chuck. In this way, scratching of the reticle surface can be minimized or largely prevented.

In the case of a more irregular reticle surface when multiple local high points exist, closing of gaps will still start from the contacting areas and move outward with the help of the low friction thin film on the reticle backside and/or on the chuck frontside.

Referring now to FIG. 1 shown is a cross section view of an assembly in accordance with an embodiment of the present invention. As shown in FIG. 1, assembly 10 includes a reticle 20 having a convex backside shape. Thus, a backside 24 of reticle 20 has a low point at or near its center 25, while its high point is at or near its peripheries 27 and 28. A frontside 22 of reticle 20 having a concave shape may contain the pattern to be transferred to a semiconductor wafer.

Referring still to FIG. 1, the reticle 20 may be chucked to an electrostatic chuck 30. As shown in FIG. 1, the electrostatic chuck 30 may include a lubricating film or fluid 32 over a top (front) surface that is to be contacted by reticle 20. Electrostatic chuck 30 further includes electrodes 34 and 35 that may be powered by a power supply PS 40. As shown in FIG. 1, initial contact between reticle 20 and chuck 30 occurs at high point 25 of reticle 20. As a chucking force is applied, a smaller space or gap between reticle 20 and chuck 30 has a higher chucking force such that contact may be made between reticle 20 and chuck 30 from near a center 25 towards the periphery 27, 28. While shown with this particular implementation in the embodiment of FIG. 1, other implementations can be realized.

For example, instead of providing lubricating film or fluid 32 over a top surface of chuck 30, such film may be applied over a backside 24 of reticle 20. Assembly 10 may be used in extreme ultraviolet (EUV) lithography operations, although the scope of the present application is not limited in this regard. Furthermore, in some implementations a reticle in accordance with an embodiment of the present invention can be used in other lithography systems without a chuck.

Figure 2:
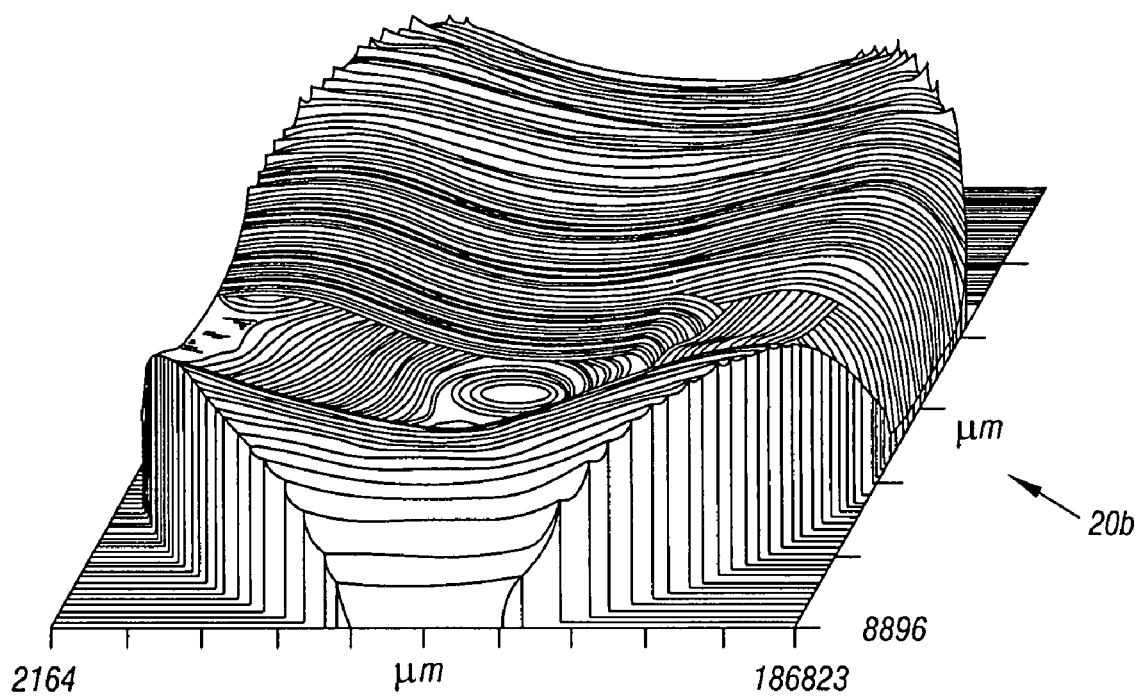
FIG. 2 is an illustration of a reticle in accordance with another embodiment of the present invention, where a global concave shape of the reticle backside is considered.

FIG. 2 illustrates a reticle 20b having a global convex shape that may have a backside with a lower inner region surrounded by higher outer regions. This shape may thus have tensile stress on the front surface that causes the mask backside to have a shape resembling a dome or a tent held down at several locations along its lower edges.

Figure 3:
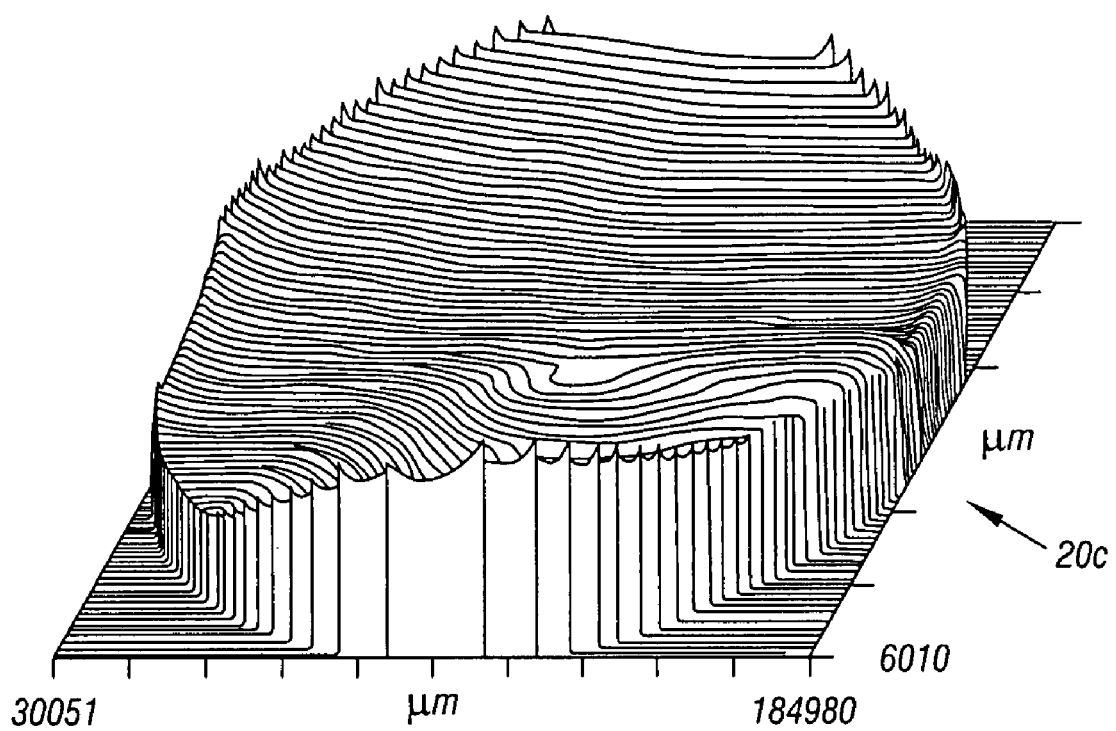
FIG. 3 is an illustration of a reticle in accordance with another embodiment of the present invention where a combination of local convex and local concave shapes are mixed at the reticle backside.

FIG. 3 illustrates a reticle 20c having a local convex shape that may have a backside with irregularly positioned low and high regions. This shape may thus have multiple low dishing areas on the backside of the mask.

In some embodiments, a thin film may be coated or applied to the topside (frontside) of the chuck, as well as to the backside of the reticle, to reduce sliding friction during the chucking process. In still further embodiments, the lack of flatness in a reticle and/or chuck to which the reticle is coupled can be reduced or prevented by applying a thin film or coating to compensate for variability or non-uniformity in flatness. The thin film or coating may have a thickness between approximately several nanometers (nm) to several microns, applied with a liquid phase (wet) process or a gas phase process, and may be provided on a reticle having a thickness, such as 6.35 millimeters (mm). In various embodiments, various thin films can be used to provide lubrication and enable low sliding friction. Such low friction materials may have a coefficient of friction ($\mu$) of 0.01-0.35, and preferably 0.05-0.10 in some embodiments.

In various embodiments, the thin film may be coated or applied to the reticle backside and/or the chuck topside (frontside). The thin film or coating may be an electrically conducting material, such as a non-crystalline carbon, a doped semiconductor, a metal, or an alloy.

The thin film or coating may be homogenous or monolithic, such as a single layer. Furthermore, the material may have a smooth surface with low sliding friction and have physical properties suitable for wear resistance and particle-free operation. Still further the material may be designed to withstand mask cleaning and provide corrosion resistance.

In some embodiments, two or more layers or two or more materials may be combined to satisfy most or all of the requirements. The thin film or coating may include a heterogeneous layer or a multilayer stack, such as a base layer for good adhesion and/or conductivity with additional intermediate layers or overlying layers formed thereon, such as for low sliding friction, wear resistance, electrical conductivity, electrical insulation, or thermal conductivity.

In various embodiments, the thin film or coating may be formed by physical vapor deposition (PVD) of carbon, metal, or alloy. Still other implementations may include direct current (DC) or radio frequency (RF) magnetron sputter deposition, cathodic arc evaporation, pulsed laser ablation, or plasma-enhanced chemical vapor deposition (PECVD). Alternately, ion-beam assisted deposition (IBD) or atomic layer deposition (ALD) may be performed. Still further, in embodiments in which the thin film includes a polymer, a single phase or multiphase process, including a spin-on or sol-gel process, may be used. Still further, in forming the thin film, various rework procedures, including options such as stripping, cleaning, repairing, refinishing, recoating, or reapplying may be performed.

Figure 4:
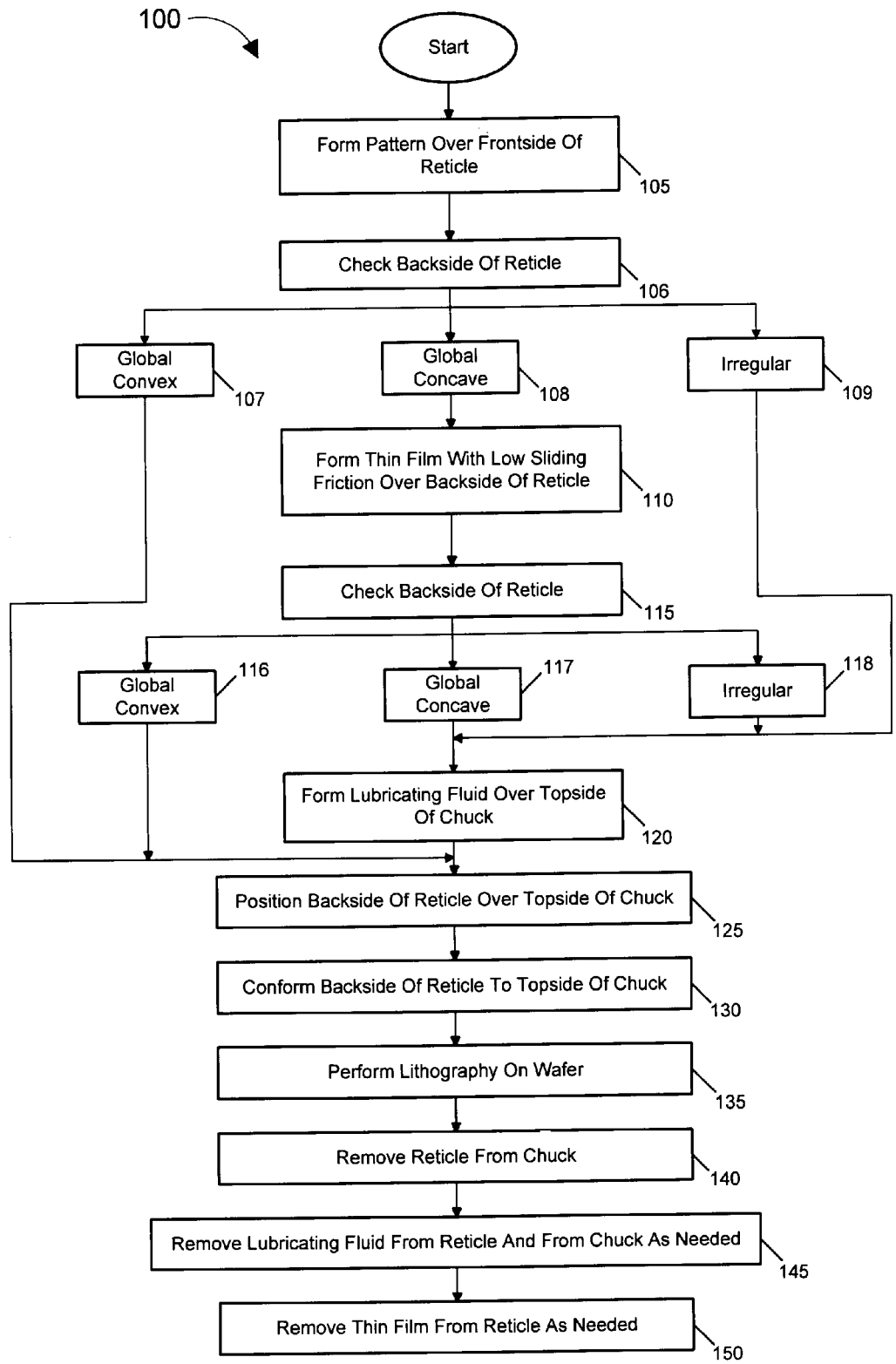
FIG. 4 is a flow diagram of a method in accordance with one embodiment of the present invention.

Referring now to FIG. 4, shown is a flow diagram of a method in accordance with one embodiment of the present invention. As shown in FIG. 4, method 100 may be used to both form a reticle in accordance with an embodiment of the present invention, as well as (optionally) to use the reticle in lithography operations. As shown in FIG. 4, method 100 may begin by forming a pattern over a frontside of a reticle (block 105). Control passes to block 106 where the backside of the reticle is checked to determine whether it has a shape that is either global convex (block 107), global concave (block 108) or irregular (block 109). Based on the analysis control passes to either blocks 110 or 125. At block 110, a thin film may be formed with low sliding friction over the reticle backside. Then at block 115 the backside of the reticle may be checked again to determine whether it is global convex (block 116), global concave (block 117) or irregular (block 118). Depending on the analysis control passes to block 120 or block 125. At block 120 a lubricating fluid may be formed over the topside of the chuck. Then at block 125 the backside of the reticle may be positioned over the topside of the chuck. At block 130 the backside of the reticle may be conformed to topside of the chuck. Then at block 135 a lithography operation may be performed on a wafer. Then at block 140 the reticle may be removed from the chuck, at block 145 a lubricating fluid removed from both reticle and chuck as needed, and at block 150 a thin film may be removed from the reticle as needed. While shown with this particular implementation in the embodiment of FIG. 4, the scope of the present invention is not limited in this regard.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    forming a thin film over a backside of a reticle;
    deforming said backside into a global convex shape;
    coupling voltage across said thin film; and
    conforming said backside of said reticle to a topside of an electrostatic chuck by sliding the reticle across the electrostatic chuck via the thin film.

2. The method of claim 1, further comprising forming a lubricating fluid over a topside of the electrostatic chuck.

3. The method of claim 1, further comprising:
    positioning said backside of said reticle over said topside of said electrostatic chuck;
    contacting high points of said backside of said reticle to said topside of said electrostatic chuck;
    coupling a voltage across said electrostatic chuck and said reticle; and
    reducing a gap between said backside of said reticle and said topside of said electrostatic chuck.

4. The method of claim 3 further comprising performing an extreme ultraviolet lithography process to transfer a pattern from said frontside of said reticle to a semiconductor wafer.

5. The method of claim 3 further comprising decoupling said voltage across said thin film.

6. The method of claim 3, further comprising forming said thin film with a plurality of layers including a base layer and an overlying layer, wherein said base layer comprises a high adhesion material and said overlying layer comprises a low sliding friction material.

7. The method of claim 3, further comprising performing a rework operation on said thin film.

8. A method comprising:
    coupling a thin film to a concave shaped backside of a reticle, the thin film including a low friction sliding material;
    applying stress, via the thin film, to the backside of the reticle to deform the backside of the reticle into a convex shaped backside portion and an unflattened backside portion; and
    coupling the reticle to an electrostatic chuck;
    wherein coupling the reticle to the chuck includes flattening the unflattened backside portion by coupling voltage across the thin film and sliding the reticle across the chuck via the low friction sliding material.

9. The method of claim 8, further comprising forming a lubricating fluid over a topside of the chuck and flattening the unflattened backside portion by sliding the reticle across the lubricating fluid.

10. The method of claim 8, wherein flattening the unflattened backside portion includes contacting high points of the reticle to the chuck before contacting low points of the reticle to the chuck, the high points being located closer to the chuck than the low points.

11. The method of claim 8 including conforming the unflattened backside portion to the electrostatic chuck by completely flattening the unflattened backside portion.

12. The method of claim 8 including forming the thin film using a liquid phase process.

13. The method of claim 8, further comprising forming a lubricating fluid over the chuck and flattening the unflattened backside portion by sliding the reticle across the lubricating fluid, wherein the lubricating fluid has a thickness that varies by position over the chuck based on temperature.

14. The method of claim 8 including forming a lubricating fluid over a topside of the chuck and flattening the unflattened backside portion by sliding the reticle across the lubricating fluid, wherein the lubricating fluid has non-Newtonian rheological properties.

15. The method of claim 8, wherein flattening the unflattened backside portion includes contacting central points of the reticle to the chuck before contacting peripheral points of the reticle to the chuck.

16. The method of claim 8 including coupling the thin film to the reticle, wherein the low friction sliding material includes a coefficient of friction ($\mu$) generally between 0.01 and 0.35.

17. The method of claim 8 including determining the backside of the reticle does not include a global convex shape and coupling the thin film to the reticle based on the determination.

18. The method of claim 9 including determining the backside of the reticle does not include a global convex deformation and coupling the thin film and lubricating fluid to the reticle based on the determination.

* * * * *